(12) United States Patent
Hu et al.

(10) Patent No.: US 11,399,162 B2
(45) Date of Patent: Jul. 26, 2022

(54) DISPLAY SYSTEM (71) Applicant: APPOTRONICS CORPORATION LIMITED, Guangdong (CN)

(72) Inventors: Fei Hu, Guangdong (CN); Xin Yu, Guangdong (CN); Chao Wu, Guangdong (CN); Mengmeng Xu, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 0 days.

(21) Appl. No.: 17/418,531

(22) PCT Filed: Dec. 23, 2019

(86) PCT No.: PCT/CN2019/127269
§ 371 (c)(1),
(2) Date: Jun. 25, 2021

(87) PCT Pub. No.: WO2020/135294
PCT Pub. Date: Jul. 2, 2020

(65) Prior Publication Data
US 2022/0070420 A1 Mar. 3, 2022

(30) Foreign Application Priority Data
Dec. 28, 2018 (CN) .......................... 201811625831.2

(51) Int. Cl.
*H04N 9/31* (2006.01)
*G03B 21/00* (2006.01)
*G03B 21/20* (2006.01)

(52) U.S. Cl.
CPC ......... *H04N 9/3155* (2013.01); *G03B 21/006* (2013.01); *G03B 21/2053* (2013.01);
(Continued)

(58) Field of Classification Search
CPC ...... H04N 9/3155; H04N 9/3179; H04N 9/31; H04N 9/3111; H04N 9/312; H04N 9/3135;
(Continued)

(56) References Cited

U.S. PATENT DOCUMENTS 6,975,366 B2 12/2005 Flint
8,864,314 B2 10/2014 Silverstein
(Continued)

FOREIGN PATENT DOCUMENTS

CN 1811573 8/2006
CN 104054336 9/2014
(Continued)

OTHER PUBLICATIONS

International Search Report for PCT/CN2019/127269, dated Mar. 12, 2020.
Chinese Office Action (Application No. 201811625831.2) dated Apr. 21, 2021, (14 pages).
First Search Report in Chinese App. No. 201811625831.2, (1 page).

*Primary Examiner* — Sherrie Hsia
(74) *Attorney, Agent, or Firm* — Nixon Peabody LLP; Jeffrey L. Costellia (57) ABSTRACT

A display system includes: a light source system configured to emit light beams; a scanner configured to scan the light beams on the surface of a spatial light modulator in the form of a light spot, the light spot corresponding to multiple pixels of the spatial light modulator; a spatial light modulator configured to modulate, according to an image modulation signal from a processing and control system, the light spot projected onto the spatial light modulator by the scanner to output image light; a processing and control system configured to output a light source timing modulation signal to a light source modulation device according to an input image signal and output an image modulation signal to the spatial light modulator; and a light source modulation device con- (Continued)

figured to adjust the output brightness of the light source system according to the light source timing modulation signal.

18 Claims, 6 Drawing Sheets

(52) U.S. Cl.
CPC ........... *H04N 9/312* (2013.01); *H04N 9/3135* (2013.01); *H04N 9/3152* (2013.01); *H04N 9/3179* (2013.01); *H04N 9/3197* (2013.01)

(58) Field of Classification Search
CPC .. H04N 9/3152; H04N 9/3161; H04N 9/3164; H04N 9/3197; G03B 21/006; G03B 21/005; G03B 21/2053
USPC ....... 348/744, 766, 759–762, 764, 767, 770, 348/771, 792
See application file for complete search history.

(56) References Cited

U.S. PATENT DOCUMENTS

| | | |
|---|---|---|
| 2002/0060753 A1 | 5/2002 | Flint |
| 2011/0013097 A1* | 1/2011 | Freeman ............... H04N 9/3182 |
| | | 348/E3.048 |
| 2013/0182226 A1 | 7/2013 | Silverstein |
| 2021/0144348 A1* | 5/2021 | Matsumoto .......... H04N 9/3155 |

FOREIGN PATENT DOCUMENTS

| | | |
|---|---|---|
| CN | 105793774 | 7/2016 |
| EP | 2805518 | 11/2014 |
| JP | 2015-508611 | 3/2015 |
| WO | WO-2013/094011 | 6/2013 |
| WO | WO-2013-109440 | 7/2013 |

* cited by examiner

DISPLAY SYSTEM

TECHNICAL FIELD

The present disclosure relates to a display technical field, and particularly to a display method and a display system.

BACKGROUND

In a conventional projection display system in a beam scanning mode, in view of a better directivity property of laser light, a direction of a laser beam is dynamically changed with a scanning device to form an image on a screen. With this technology, a light path structure can be greatly simplified. However, a high requirement is proposed in light beam collimation, and a spot size is demanded to be very small to achieve a high resolution. A single-mode laser can achieve above features of the beam and the spot. However, an output brightness of the projection display system in the light-beam scanning mode is limited by the single-mode laser. A multi-mode laser can increase the output brightness of a scanning-type projection apparatus. However, although an optical shaping device is added to a light path between a light source and a scanner, the light beam collimation and the spot size is hard to reach a majority resolution of a current spatial light modulator. Therefore, the conventional projection display system in the beam scanning mode is difficult to obtain both of a high brightness and a high resolution simultaneously.

SUMMARY

A display method and a display system are provided according to the present disclosure, which can solve the problem of being difficult to obtain both of a high brightness and a high resolution simultaneously.

One technical solution applied in the present disclosure is as follows. A display method, includes: emitting a light beam by a light source system; scanning, by a scanner, the light beam emitted from the light source system on a surface of a spatial light modulator in form of a light spot, wherein the light spot is corresponding to a plurality of pixels of the spatial light modulator; modulating, by the spatial light modulator, the light spot projected by the scanner on the spatial light modulator according to an image modulation signal from a processing and control system, and outputting image light; outputting, by the processing and control system, a light-source time-sequence modulation signal $i_n(t)$ to a light-source modulation device according to an input image signal, and outputting the image modulation signal to the spatial light modulator; and adjusting, by the light-source modulation device, at brightness of the light source system according to the light-source time-sequence modulation signal $i_n(t)$.

A display system is provided, which includes: a light source system configured to emit a light beam; a scanner configured to scan the light beam emitted from the light source system on a surface of a spatial light modulator in form of a light spot, wherein the light spot is corresponding to a plurality of pixels of the spatial light modulator; the spatial light modulator configured to modulate the light spot projected on the spatial light modulator by the scanner, according to an image modulation signal from a processing and control system, and to output image light; the processing and control system configured to output a light-source time-sequence modulation signal $i_n(t)$ to a light-source modulation device according to the input image signal, and output the image modulation signal to the spatial light modulator; and the light-source modulation device configured to adjust an output brightness of the light source system according to the light-source time-sequence modulation signal $i_n(t)$.

A beneficial effect of the present disclosure lies in that compared with the conventional technology, a display system according to the present disclosure includes a light source system, a scanner, a spatial light modulator, a processing and control system, and a light-source modulation device. In the present disclosure, light spot scanning is performed on a surface of the spatial light modulator, in which a scanning light spot correspond to multiple pixels of the spatial light modulator. Thus, a sharpness problem in image modulation is mainly transmitted to the spatial light modulator, thus reducing demands in the size and the precision of the scanning lights-spot. In this way, the light source is not limited to the single-mode laser, which solves a problem of being difficult to obtain both of the high brightness and the high resolution simultaneously in the conventional projection display system in the light-beam scanning mode. In addition, by performing modulation to the light-spot brightness and the spatial light modulator simultaneously in combination with the input image signal, image display in a higher dynamic range can be achieved.

DESCRIPTION OF EMBODIMENTS

Figure 1:
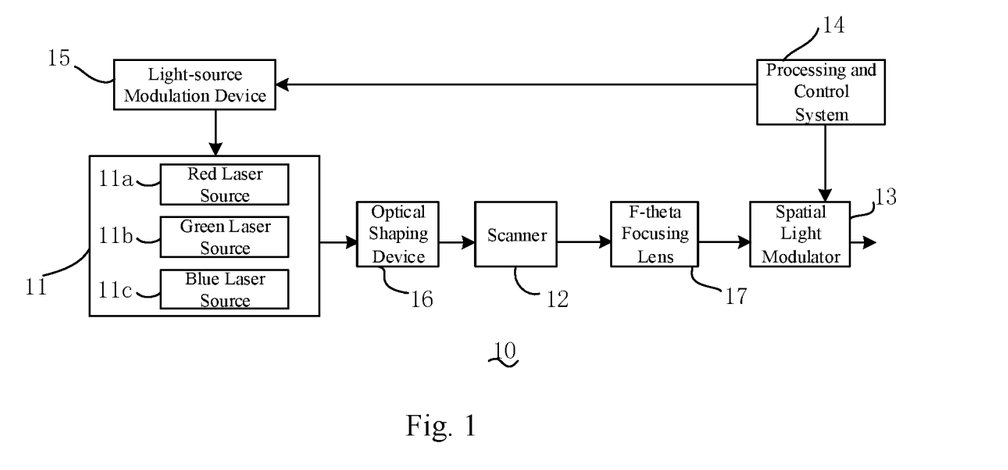
FIG. 1 is a structure schematic diagram of a display system according to embodiments 1 to 4 of the present disclosure.

Referring to FIG. 1, FIG. 1 is a structure schematic diagram of a display system according to an embodiment 1 of the present disclosure. As shown in FIG. 1, a display system 10 of the present disclosure includes a light source system 11, a scanner 12, a spatial light modulator 13, a processing and control system 14, and a light-source modulation device 15. The light source system 11 emits a light beam. The scanner 12 uses the light beam to scan on a surface of the spatial light modulator 13 in a form of a light spot. Then image light generated by modulation of the spatial light modulator 13 is projected to form a display image (not shown). The processing and control system 14, according to the input image signal, outputs a light-source time-sequence modulation signal $i_n(t)$ to the light-source modulation device 15, and outputs an image modulation signal to the spatial light modulator 13. The spatial light modulator 13 modulates the light spot scanned on the surface thereof according to the image modulation signal, and the light-source modulation device 15 adjusts an output brightness of the light source system 11 according to the light-source time-sequence modulation signal $i_n(t)$.

Figure 2:
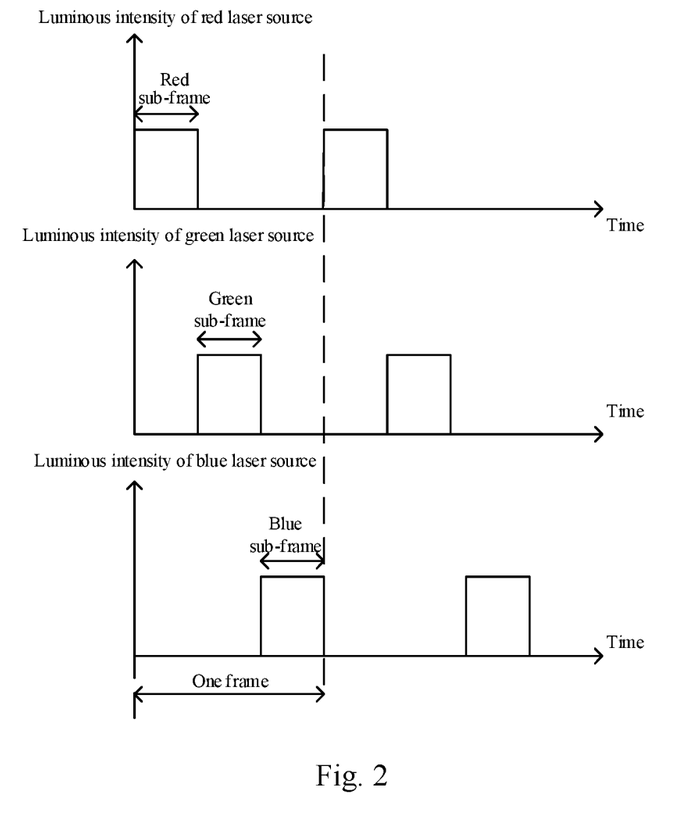
FIG. 2 is an illustration of a time-sequence adjusting mode of a light source system in a display system according to an embodiment 1 of the present disclosure.

Specifically, the light source system 11 is configured to emit a light beam. In one embodiment, the light source system 11 is a laser source system. In this embodiment, the light source system 11 is a three-color laser source for adjusting a red laser light, a green laser light and a blue laser light in a time sequence, where 11a is a red laser source, 11b is a green laser source, and 11c is a blue laser source. Referring to FIG. 2, FIG. 2 is an illustration of a time-sequence adjusting mode of the light source system 11. Specifically, when the red laser source 11a is turned on, the green laser source 11b and the blue laser source 11c are turned off. When the green laser source 11b is turned on, the red laser source 11a and the blue laser source 11c are turned off. When the blue laser source 11c is turned on, the red laser source 11a and the green laser source 11b are turned off.

The scanner 12 is configured to scan the light beam emitted by the light source system 11 on the surface of the spatial light modulator 13 in a form of a light spot. The light spot corresponds to multiple pixels of the spatial light modulator 13. In one embodiment, the light spot is in the shape of a rectangle.

For example, the number of pixels of the spatial light modulator 13 is 1920×1080. The light spot may be a rectangular light spot covering 1×108 pixels. Alternatively, the light spot may be a rectangular light spot covering 10×10 pixels. The examples are only for convenience of illustration, and the specific value for the size of the light spot is not limited in the present disclosure.

The scanner 12 may be a two-dimensional scanning mirror, a two-dimensional scanning mirror cascaded by two one-dimensional scanning mirrors, a rotatable polygonal mirror, a rotatable scanning mirror, MEMS (Micro-Electro-Mechanical System) galvanometer, an electro-optical crystal, an acousto-optic crystal, an optical phased array, a liquid-crystal optical deflector, a fiber scanning device using resonance, and so on.

In one embodiment, the spatial light modulator 13 is a transmissive liquid crystal light valve or a reflective liquid crystal light valve. This kind of spatial light modulator is an "analog-type device", in which light beam transmittance is adjusted by changing an orientation of the liquid crystal in combination with a polarization analyzer. Once the adjustment to the orientation of the liquid crystal is completed, the light transmittance can be stably controlled.

The processing and control system 14 divides the image signal into three-color image signals, i.e., a red image signal, a green image signal, and a blue image signal. A frame of an image corresponding to the image signal is divided into a red sub-frame image, a green sub-frame image and a blue sub-frame image. Each of the red sub-frame image, the green sub-frame image, and the blue sub-frame image is divided into multiple sub-image areas along a scanning direction of the light spot, to obtain an image brightness amplitude signal $L_{in}(t)$ of each sub-image area along the scanning direction of the light spot according to a maximum pixel brightness in this sub-image area. In combination with a correlation $i=f(L)$ between the brightness of the light source system and the current of the light source, a light-source time-sequence modulation signal $i_n(t)$ is obtained, which is outputted to the light-source modulation device 15.

A size of the sub-image area corresponds to a same number of pixels of the spatial light modulator as a size of the light spot. For example, the light spot is a rectangular light spot including 1×108 pixels, and the sub-image area includes 1×108 pixels.

The light-source modulation device 15 adjusts the output brightness of the light source system 11 according to the light-source time-sequence modulation signal $i_n(t)$, so as to adjust a brightness of the light spot of the scanner 12 scanning on the surface of the spatial light modulator 13. In addition, the processing and control system 14, according to the output brightness of the light source system 11, predicts a light-shade distribution on the surface of the spatial light modulator 13 after each color sub-frame of light spot scanning the spatial light modulator 13; compares the light-shade distribution with the red image signal, the green image signal and the blue image signal; and outputs the image modulation signal to the spatial light modulator 13. The spatial light modulator 13 performs a deflection action according to the input image modulation signal.

For example, the processing and control system 14, according to the input image signal, divides the image signal into corresponding red, green, and blue image signals. A frame corresponding to the image signal is divided into a red sub-frame image, a green sub-frame image and a blue sub-frame image. Assuming that each frame of the image includes 1920×1080 pixels, there is 1920×1080 pixels in each of the red, green and blue sub-frame images. Taking a sub-image area of 1×108 pixels, each of red, green and blue sub-frame images includes 19200 sub-areas. According to the scanning direction of the light spot and the maximum pixel brightness in each sub-area, an image brightness amplitude signal $L_{in}(t)$ changing with a scanning time can be obtained. Taking the red sub-frame as an example, the image brightness amplitude signal corresponding to the red sub-frame is $L_{iR}(t)$. In combination with the correlation $i=f(L)$ between the brightness of the light source system and the current of the light source, the light-source time-sequence modulation signal $i_R(t)$ is obtained to control the light-source modulation device 15, so as to adjust the output brightness of the red laser source 11a. The correlation $i=f(L)$ between the brightness of the light source system and the current of the light source is determined by a property of the light source system. Generally, within an adjustable range of the light source system, the greater the input current of the light source system, the greater the corresponding brightness is. In the case of the determined light source system, the correlation between the brightness of the light source system and the current of the light source can be obtained by searching. The output brightness of the blue laser source in the blue sub-frame and the output brightness of the green laser source in the green sub-frame have the same adjustment method as the output brightness of the red laser source in the red sub-frame.

In this embodiment, the display system may further include an optical shaping device 16 and an f-theta focusing lens 17. The optical shaping device 16 is provided in a light path between the light source system 11 and the scanner 13, which is configured to shape the light beam emitted from the light source system 11 to obtain a uniform light beam with a relatively small divergence angle, and configured to direct the light beam to the scanner 12. The optical shaping device 16 may be an optical device such as a light pipe or fly-eye lens. The f-theta focusing lens 17 is provided in the light path between the scanner 12 and the spatial light modulator 13, which is configured to linearly scan the deflection light beam outputted by the scanner 12 to the spatial light modulator 13. In this way, uniform speed linear scanning of the scanner 12 on the spatial light modulator 13 in a light-spot form is achieved. The optical shaping device 16 and the f-theta focusing lens 17 are not essential device and thus may be omitted.

In consideration of a cost, modulation bandwidths of certain light sources are not large enough. When the brightness needs to be adjusted in a larger range, these light sources cannot satisfy modulation requirements. Therefore, the light-source brightness amplitude signal may be lower than the image brightness amplitude signal locally, so as to obtain a distorted image.

Specifically, due to a relatively narrow modulation bandwidth of the light source, an adjustment speed for the brightness of the light source cannot satisfy the demands. Therefore, in a sudden-change area (generally a high-frequency area of the image) of the image brightness amplitude signal, the adjustment to the brightness of the light source cannot be tracked quickly. That is, in the sudden-increase area of the image brightness amplitude signal, the output brightness of the light source cannot be increased to a demand value of the image brightness amplitude signal. In a sudden-decrease area, it is also difficult to reduce to a demand value of the image brightness amplitude signal.

In an embodiment 2 of the present disclosure, low-pass filtering is firstly performed on the image brightness amplitude signal and then local adjustment is performed to solve this problem. The embodiment 2 differs from the embodiment 1 only in that the image brightness amplitude signal $L_{in}(t)$ passes through the low-pass filter and is adjusted locally to obtain the light-source brightness amplitude signal $L_{s3n}(t)$. The light-source time-sequence modulation signal $i_n(t)$ is obtained with the light-source brightness amplitude signal $L_{s3n}(t)$ in combination with the correlation $i=f(L)$ between the brightness of the light source system and the current of the light source.

Specifically, the processing and control system 14 divides the image into multiple sub-image areas along the scanning direction of the light spot according to the input image signal. According to a maximum pixel brightness in each sub-image area, the image brightness amplitude signal $L_{in}(t)$ of each sub-image area along the scanning direction of the light spot is obtained. The light-source brightness amplitude signal $L_{s2n}(t)$ is obtained by passing the image brightness amplitude signal $L_{in}(t)$ through the low-pass filter. Here, a cut-off frequency of the low-pass filter is greater than or equal to a current modulation bandwidth of the light source system. An objective for this calculation lies in determining a high-frequency modulation area of the image brightness amplitude signal $L_{in}(t)$, i.e., an area, with a frequency greater than the current modulation bandwidth of the light source system, in the image brightness amplitude signal $L_{in}(t)$.

Local adjustment is performed on the filtered light-source brightness amplitude signal $L_{s2n}(t)$. Here, the local adjustment is used to increase a target signal by a certain value to satisfy modulation requirements. By local adjustment, the light-source brightness amplitude signal $L_{s3n}(t)$ is always no less than the image brightness amplitude signal $L_{in}(t)$ in each frame of image. The light-source time-sequence modulation signal $i_n(t)$ is obtained with the light-source brightness amplitude signal $L_{s3n}(t)$ in combination with the correlation $i=f(L)$ between the brightness of the light source system and the current of the light source. The correlation $i=f(L)$ between the brightness of the light source system and the current of the light source is determined by a property of the light source system. Generally, within an adjustable range of the light source system, the greater the input current of the light source system, the greater a corresponding brightness is. In the case of the determined light source system, the correlation between the brightness of the light source system and the current of the light source may be obtained by searching.

Due to an accurate adjustment of the spatial light modulator to the image, a "light-reducing" operation may only be performed to the light spot on the surface of the spatial light modulator. Therefore, for a latter case, the output brightness of the light source is greater than a demand value of the image brightness amplitude signal, and an original image brightness can be restored by modulation of the spatial light modulator. For the case in which the output brightness of the light source is lower than the demand value of the image brightness amplitude signal, although the spatial light modulator further performs the modulation, the image brightness cannot be increased, thereby rendering image distortion. Therefore, in the present disclosure, the local adjustment is performed on the light-source brightness amplitude signal $L_{s2n}(t)$, and a numerical value of the light-source brightness amplitude signal is locally increased. For example, in an area in which the light-source brightness amplitude signal $L_{s2n}(t)$ is less than the image brightness amplitude signal $L_{in}(t)$, a numerical value is added for the light-source brightness amplitude signal $L_{s2n}(t)$. The numerical value is determined based on a difference between the light-source brightness amplitude signal $L_{s2n}(t)$ and the image brightness amplitude signal $L_{in}(t)$. In this way, in a frame of the image, the light-source brightness amplitude signal $L_{s3n}(t)$ after the local adjustment is always no less than the image brightness amplitude signal $L_{in}(t)$. It is understood that the light-source brightness amplitude signal of the entire frame of the image may totally be increased for a simple calculation, so as to satisfy an accurate display in a high-light area of the image.

In the embodiment 2, locations and functions of other devices may make reference to the description of embodiment 1, which is not repeated here.

In this embodiment, compared with the embodiment 1, calculation operations of low-pass filtering and local adjustment are added. As such, an image distortion problem is solved, which is caused by failing to reach adjusting speed requirements of the light-source brightness due to a relatively narrow light-source modulation bandwidth and a part of the light-source brightness amplitude signal being lower than the image brightness amplitude signal.

Generally, after homogenization and shaping to a light beam, it is considered that a light spot scanning on the surface of the spatial light modulator is a uniform light spot with a plane distribution. However, in an actual product, in consideration of a volume and a light homogenization effect of a light-homogenization device, it is hard to realize a completely homogeneous light spot in a small size of the light path. That is to say, the light spot may have a non-uniform brightness distribution, particularly in a system without the light-homogenization device. Generally, the brightness distribution of a laser spot is a Gaussian distribution. For a system with a default homogeneous distribution of the light spot, image display with a high reduction degree cannot be obtained. For convenient description, a case in which a light spot itself has a non-uniform brightness distribution is called a non-uniform brightness distribution within the light spot.

In addition, in a continuous scanning mode, the light spot brightness on the surface of the spatial light modulator changes over time, thus rendering the non-uniform light distribution in the sub-image area. Therefore, when the image modulation is performed on each sub-image area, a problem in the brightness distribution of the light spot after time superposition has to be considered. For convenient description, the case of the non-uniform light distribution in the sub-image area due to the light-spot brightness changing over time is called a non-uniform brightness distribution in the sub-image area.

For further solving the above non-uniform brightness distribution within the light spot and the non-uniform brightness distribution in the sub-image area, based on the embodiment 1, deconvolution is performed on the image brightness amplitude signal and the brightness distribution of the light spot in an embodiment 3. The embodiment 3 differs from the embodiment 1 only in that the deconvolution is performed on the image brightness amplitude signal $L_{in}(t)$ and the brightness distribution $L_{gn}(t)$ of the light spot to obtain the light-source brightness amplitude signal $L_{s1n}(t)$. The light-source time-sequence modulation signal $i_n(t)$ is obtained with the light-source brightness amplitude signal $L_{s1n}(t)$ in combination with the correlation i=f(L) between the brightness of the light source system and the current of the light source.

Specifically, the processing and control system 14 divides the image into multiple sub-image areas along the scanning direction of the light spot according to the input image signal, and obtains the image brightness amplitude signal $L_{in}(t)$ of each sub-image area along the scanning direction of the light spot according to a maximum pixel brightness of each sub-image area. The deconvolution is performed on the image brightness amplitude signal $L_{in}(t)$ and the brightness distribution $L_{gn}(t)$ of the light spot. The light-source time-sequence modulation signal $i_n(t)$ is obtained according to the light-source brightness amplitude signal $L_{s1n}(t)$ in combination with the correlation i=f(L) between the brightness of the light source system and the current of the light source. The correlation i=f(L) between the brightness of the light source system and the current of the light source is determined by the property of the light source system. Generally, within an adjustable range of the light source system, the greater the input current of the light source system, the greater the corresponding brightness is. In the case of the determined light source system, the correlation between the brightness of the light source system and the current of the light source may be obtained by searching.

Therefore, this embodiment differs from the embodiment 1 in that the deconvolution is performed on the image brightness amplitude signal $L_{in}(t)$ and the brightness distribution $L_{gn}(t)$ of the light spot, to obtain the light-source brightness amplitude signal $L_{s1n}(t)$, while solving problems of the non-uniform brightness distribution within the light spot and the non-uniform brightness distribution in the sub-image area.

If a length of the light spot along the scanning direction corresponds to less than 2 pixels of the spatial light modulator, a calculation process may be simplified. This is because when the length of the light spot in the scanning direction is small enough, a luminous flux superposition of the light spot in time may be omitted in the same location. Specifically, the preferred light spot has a width of one pixel along the scanning direction. For example, if the light spot is a rectangular light spot including 1×108 pixels or a rectangular light spot including 1×10 pixels, a calculation process can be simplified, in which the deconvolution is performed on the image brightness amplitude signal $L_{in}(t)$ and the brightness distribution $L_{gn}(t)$ of the light spot to obtain the light-source brightness amplitude signal $L_{s1n}(t)$.

The non-uniform brightness distribution of the sub-image area may be solved by applying a light spot with a size of one pixel in the scanning direction. However, the non-uniform brightness distribution within the light spot may still exist. In a variant embodiment of the embodiment 3 of the present disclosure, based on the light spot with a size of one pixel in the scanning direction, a longitudinal distribution of the light spot is considered comprehensively, so as to solve both the non-uniform brightness distribution within the light spot and the non-uniform brightness distribution in the sub-image area simultaneously.

Specifically, the processing and control system 14, according to the longitudinal distribution (a distribution vertical to the scanning direction) of the light spot and the output brightness of the light source system 11, predicts a light-shade distribution on the surface of the spatial light modulator 13 after the light spot scans the spatial light modulator 13 in each color sub-frame; compares the light-shade distribution with the red, the green and the blue image signals; and outputs an image modulation signal to the spatial light modulator 13. The spatial light modulator 13 performs a deflection action according to the input image modulation signal.

In the embodiment 3, locations and functions of other devices may make reference to the description of the embodiment 1, which is not repeated here.

The embodiment 3 is similar to embodiment 1 in that the brightness modulation speed of the light source system may be limited to the modulation bandwidth of the light source as well, such that the light-source brightness amplitude signal is smaller than the image brightness amplitude signal locally, thus rendering the image distortion. In an embodiment 4 of the present disclosure, low-pass filtering and then the local adjustment are performed on the image brightness signal obtained by the deconvolution in the embodiment 3, to solve this problem.

Figure 3:
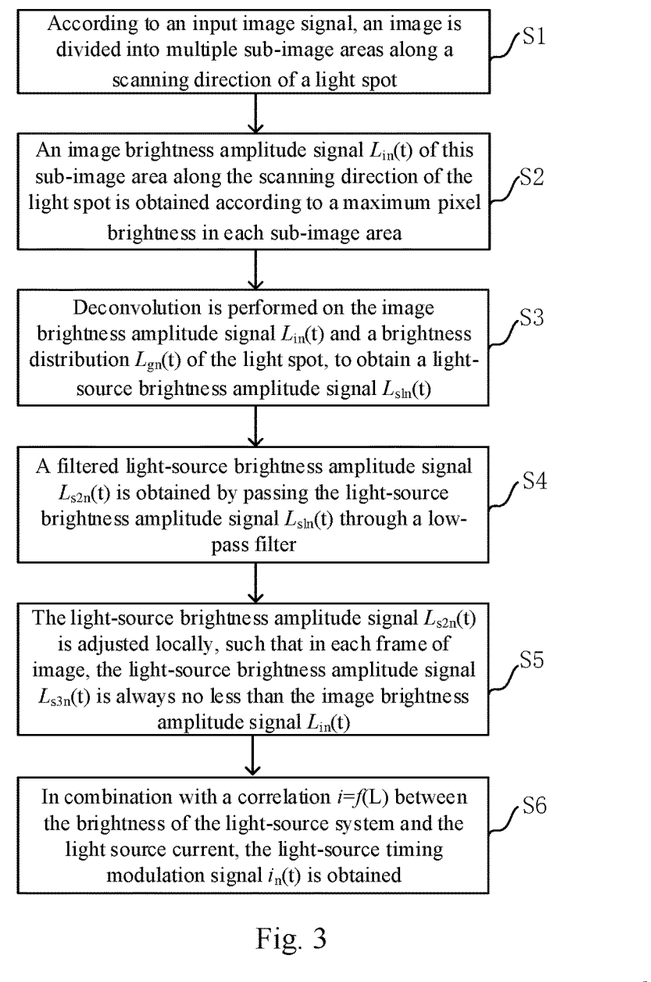
FIG. 3 is a flow diagram of a current modulation algorithm of a display system according to an embodiment 4 of the present disclosure.

FIG. 3 is a flow diagram of a current modulation algorithm of a display system according to an embodiment 4 of the present disclosure. Specifically, during the operation of the processing and control system 14, the current modulation algorithm may include steps S1-S6.

In step S1, according to an input image signal, an image is divided into multiple sub-image areas along a scanning direction of a light spot.

In step S2, an image brightness amplitude signal $L_{in}(t)$ of each sub-image area along the scanning direction of the light spot is obtained according to a maximum pixel brightness in the sub-image area.

In step S3, deconvolution is performed on the image brightness amplitude signal $L_{in}(t)$ and a brightness distribution $L_{gn}(t)$ of the light spot, to obtain a light-source brightness amplitude signal $L_{s1n}(t)$.

In step S4, the light-source brightness amplitude signal $L_{s1n}(t)$ passes through a low-pass filter, to obtain the filtered light-source brightness amplitude signal $L_{s2n}(t)$.

In step S5, the light-source brightness amplitude signal $L_{s2n}(t)$ is adjusted locally, such that in each frame of image, the light-source brightness amplitude signal $L_{s3n}(t)$ is always no less than the image brightness amplitude signal $L_{in}(t)$.

In step S6, in combination with a correlation i=f(L) between the brightness of the light source system and the current of the light source, the light-source time-sequence modulation signal $i_n(t)$ is obtained.

Specifically, the processing and control system 14, according to the input image signal, divides the image signal into corresponding red, green, and blue image signals. A frame corresponding to the image signal is divided into a red sub-frame, a green sub-frame and a blue sub-frame.

Modulation to the output brightness of the red laser source in the red sub-frame is taken as an example. Assuming that each frame of image includes 1920×1080 pixels, each of the red, the green and the blue sub-frames includes 1920×1080 pixels. If the sub-image area includes 2×108 pixels, each of the red, the green and the blue sub-frames includes 9600 sub-areas. According to the scanning direction of the light spot and the maximum pixel brightness in each sub-area, it is possible to obtain the image brightness amplitude signal $L_{iR}(t)$ changing over time, where the image brightness amplitude signal corresponding to the red sub-frame is $L_{iR}(t)$. Deconvolution is performed to the $L_{iR}(t)$ and the brightness distribution $L_{gR}(t)$ of the red light spot to obtain the brightness amplitude signal $L_{s1R}(t)$ for the red light source. The brightness amplitude signal $L_{s2R}(t)$ for the red light source is obtained by passing through the low-pass filter. Local adjustment is performed on the filtered waveform, such that in a period of the red sub-frame, the brightness amplitude signal $L_{s3R}(t)$ of the red light source is always no less than the red image brightness amplitude signal $L_{iR}(t)$. Based on the brightness amplitude signal $L_{s3R}(t)$ of the red light source in combination with the correlation i=f(L) between the brightness of the light source system and the current of the light source, the time-sequence modulation signal for the red light source is obtained, to control the light-source modulation device 15 for adjusting the output brightness of the red laser source 11a. The correlation i=f(L) between the brightness of the light source system and the current of the light source is determined by a property of the light source system. Generally, within an adjustable range of the light source system, the larger the input current of the light source system, the larger the corresponding brightness is. In the case of the determined light source system, the correlation between the brightness of the light source system and the current of the light source can be obtained by searching. In the blue sub-frame and in the green sub-frame, the output brightness of the blue laser source and the output brightness of the green laser source are adjusted similarly to that of the red laser source, which thus is not repeated here.

Compared with the embodiment 1, both of the non-uniform brightness distribution within the light spot and the non-uniform brightness distribution in the sub-image area may simultaneously be solved by the deconvolution in this embodiment. Moreover, low-pass filtering and calculation operations of local adjustment are added, so as to solve an image distortion problem due to a relatively narrow modulation bandwidth of the light-source, the adjusting speed of the light-source brightness failing to reach demands and the light-source brightness amplitude signal being lower than the image brightness amplitude signal locally.

Similarly to the embodiment 3, if a length of the light spot along the scanning direction corresponds to less than 2 pixels of the spatial light modulator, a calculation process of performing the deconvolution on the image brightness amplitude signal $L_{in}(t)$ and the brightness distribution $L_{gn}(t)$ of the light spot to obtain the light-source brightness amplitude signal $L_{s1n}(t)$ can be simplified. Specifically, the preferred light spot has a width of one pixel along the scanning direction, and the influence of the light spot in time superposition in scanning the same location may be omitted. Then the non-uniform brightness distribution of the sub-image area may be solved. Selecting the light spot with a width of one pixel along the scanning direction may also be applied to the embodiment 1 and the embodiment 2, so as to solve the non-uniform brightness distribution within the sub-image area.

However, according to the above description, the non-uniform brightness distribution within the light spot still exists by applying this simplified algorithm. In a variant embodiment of the embodiment 4 of the present disclosure, to solve the above problem, based on the length of the light spot along the scanning direction being less than 2 pixels, the processing and control system 14, according to the longitudinal distribution of the light spot (a distribution vertical to the scanning direction) and the output brightness of the light source system 11, predicts a light-shade distribution on the surface of the spatial light modulator 13 after the light spot scans the spatial light modulator 13 in each color sub-frame; compares the light-shade distribution to the red, the green and the blue image signals; and outputs an image modulation signal to the spatial light modulator 13. The spatial light modulator 13 performs a deflection action according to the input image modulation signal.

Specifically, it is assumed that the light spot is a rectangular light spot including 1×108 pixels. A ratio between a light-spot brightness of 54 pixel areas in a middle area and a light-spot brightness of 27 pixel areas in each of the upper area and the lower area is a:1 (a>1). Disadvantages brought by the non-uniform brightness distribution of the light spot should be considered by the processing and control device. The processing and control device outputs the image modulation signal to the spatial light modulator 13 in combination with the light-spot distribution and the output brightness of the light source system 11. The examples are only for convenience of illustration, and the light-spot distribution is not limited in the present disclosure.

Figure 4:
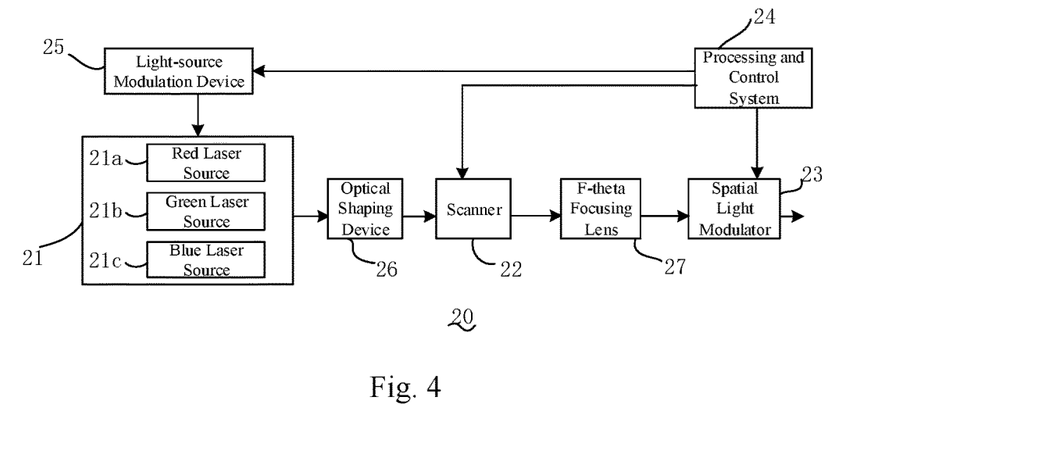
FIG. 4 is a structure schematic diagram of a display system according to embodiments 5 to 6 of the present disclosure.

Referring to FIG. 4, FIG. 4 is a structure schematic diagram of a display system according to an embodiment 5 of the present disclosure. A display system 20 of the present disclosure includes a light source system 21, a scanner 22, a spatial light modulator 23, a processing and control system 24, a light-source modulation device 25, an optical shaping device 26, and an f-theta focusing lens 27. This embodiment differs from the embodiment 1 only in that the processing and control system 24 in the provided display system further includes deflection control to the spatial light modulator 23 and scanning control to the scanner 22. The processing and control system 24 outputs the image modulation signal to the spatial light modulator 23, and outputs a synchronous signal to the scanner 22 after a preset time interval. Operations of other devices may be performed with reference to the embodiment 1. Identical with the embodiment 1, the optical shaping device 26 and the f-theta focusing lens 27 are not essential devices.

Specifically, the processing and control system 24 outputs the image modulation signal to the spatial light modulator 23, and outputs the synchronous signal to the scanner 22 after the preset time interval. After receiving the synchronous signal, the scanner 22 directs the light beam to an original scanning position on the surface of the spatial light modulator 23. Here, the preset time interval may be a maximum deflection time required by the spatial light modulator 23 in one color sub-frame.

For example, the spatial light modulator 23 is a reflective liquid crystal light valve. The processing and control system 24 outputs the image modulation signal to the spatial light modulator 23. The reflective liquid crystal light valve performs the modulation on the image with 1920×1080 pixels according to the image modulation signal. A maximum deflection time of the reflective liquid crystal light valve is 1.6 ms. Thus, after 1.6 ms from the spatial light modulator 23 receiving the image modulation signal, the processing and control system 24 outputs the synchronous signal to the scanner 22. After receiving the synchronous signal, the scanner 22 directs the light beam to the original scanning position on the surface of the spatial light modulator 23 and starts scanning.

In this embodiment, after the preset time interval from the spatial light modulator 23 outputting the image modulation signal, the processing and control system 24 sends the synchronous signal to the scanner 22 to control the scanner 22 to start scanning. In this way, the processing and control system 24 can control the scanner 22 to start scanning after the spatial light modulator 23 completes the deflection, so as to avoid the image distortion caused by the scanner starting scanning on the surface of the spatial light modulator 23 before the spatial light modulator completes the deflection.

In a variant embodiment, such as embodiment 6, of the embodiment 5 of the present disclosure, this embodiment differs from embodiment 5 in that after the spatial light modulator 23 receives the image modulation signal and completes the deflection, the processing and control system 24 outputs the synchronous signal to the scanner 22. In this embodiment, a time when the scanner 22 starts scanning changes dynamically over a deflection time required by the spatial light modulator 23 in each color sub-frame.

Specifically, after the spatial light modulator 23 receives the image modulation signal and completes the deflection, the processing and control system 24 outputs the synchronous signal to the scanner 22. After receiving the synchronous signal, the scanner 22 directs the light beam to the original scanning position on the surface of the spatial light modulator 23.

In this embodiment, after receiving a deflection completion signal from the spatial light modulator 23, the processing and control system 24 sends the synchronous signal to the scanner 22 to control the scanner 22 to start scanning. In this way, the processing and control system 24 can control the scanner 22 to start scanning after the spatial light modulator 23 completes the deflection, so as to avoid the image distortion caused by the scanner starting scanning on the surface of the spatial light modulator 23 before the spatial light modulator completes the deflection.

Figure 5:
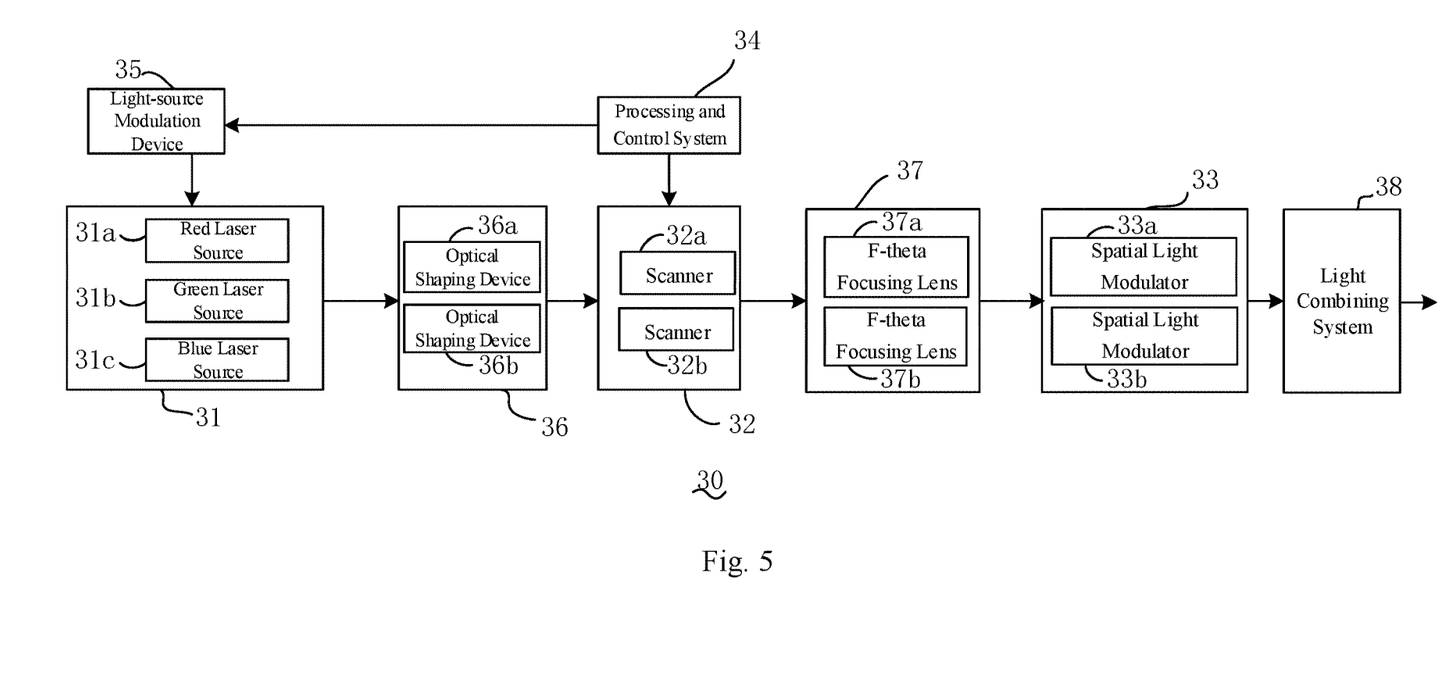
FIG. 5 is a structure schematic diagram of a display system according to an embodiment 7 of the present disclosure.

Referring to FIG. 5, FIG. 5 is a structure schematic diagram of a display system according to an embodiment 7 of the present disclosure.

The display system 30 in this embodiment differs from that in the embodiment 1 in that a scanner group 32 includes two scanners 32a, 32b. The scanner 32a scans the light beam emitted from the light source system 31 to the spatial light modulator 37a, while scanner 32b scans the light beam emitted from the light source system 31 to the spatial light modulator 37b. A light combining system 38 is configured to combine image light emitted from the spatial light modulator 37a with image light emitted from the spatial light modulator 37b.

Figure 6:
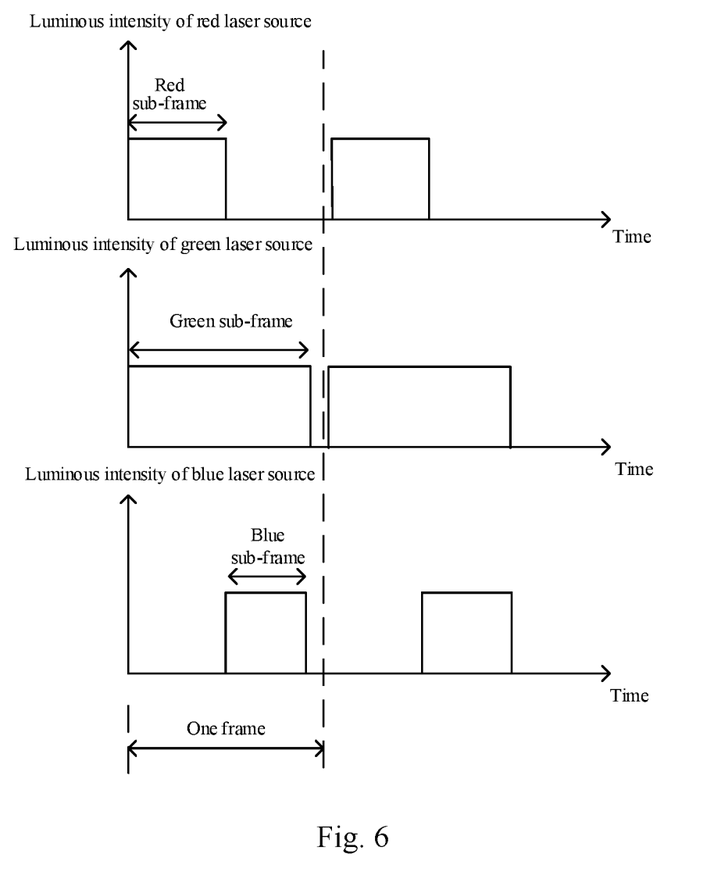
FIG. 6 is an illustration of a time-sequence adjusting mode of a light source system in a display system according to an embodiment 7 of the present disclosure.

In this embodiment, the light source system 31 performs time-sequence adjustment to the red laser source, the green laser source, and the blue laser source, and an example for the time-sequence adjustment of the light source system 31 is as shown in FIG. 6. Specifically, a period of a frame of an image is divided into a first-half period of the frame of an image and a latter-half period of the frame of the image. In the first-half period of the frame of the image, the red laser source 31a is turned on, the greed laser source 31b is turned on, and the blue light source 31c is turned off. In the latter-half period of the frame of the image, the red laser source 31a is turned off, the green laser source 31b is turned on, and the blue laser source 31c is turned on. The example is only for convenience of illustration, and a sequence for turning on and off the laser sources is not limited in the present disclosure. In addition, FIG. 6 is only for convenience of illustration, in which a time proportion for sequentially turning on laser sources will not limited.

Specifically, in the first-half period of the frame of the image, the red laser source 31a is turned on, and the green laser source 31b is turned on. The scanner 32a scans a red light beam emitted from the red laser source 31a to the spatial light modulator 37a in the form of a light spot, and the scanner 32b scans a green laser beam emitted from the green laser source 31b to the spatial light modulator 37b in the form of a light spot. The light combining device 38 combines red image light emitted from the spatial light modulator 37a with green image light emitted from the spatial light modulator 37b, to form red-green image light. Specifically, in the latter-half period of the frame of the image, the blue laser source 31c is turned on, the green laser source 31b is turned on, and the red laser source 31a is turned off. The scanner 32a scans a blue laser beam emitted from the blue laser source 31c to the spatial light modulator 37a in the form of a light spot, and the scanner 32b scans a green light beam emitted from the green laser source 31b to the spatial light modulator 37b in the form of a light spot. The light combining device 38 combines blue image light emitted from the spatial light modulator 37a with green image light emitted from the spatial light modulator 37b, to form blue-green image light. Then, the red-green image light formed in the first-half period of the frame of image is combined with the blue-green image light the latter-half period of the frame of the image, thus obtaining a light beam of an image to be displayed.

In this embodiment, the display system may further include an optical shaping device group 36 and an f-theta focusing lens group 37. The optical shaping device group 36 and the f-theta focusing lens group 37 may operate with reference to the embodiment 1. Identically with the embodiment 1, the optical shaping device group 36 and the f-theta focusing lens group 37 are not essential devices.

In this embodiment, two spatial light modulators are applied to simultaneously modulate a red, a greed, and a blue light spots formed by respective scanners on the surfaces of the spatial light modulators. Compared with the embodiment 1, in this embodiment, one of the scanners only needs to traverse a corresponding spatial light modulator in a half period of the frame of the image, and the other scanner only needs to traverse a corresponding spatial light modulator in a period of the frame of the image. Therefore, the light-source modulation device for the red laser source and the light-source modulation device for the blue laser source complete current modulation of the light source system within the half period of the frame as well, while the light-source modulation device for the green laser source only needs to complete current modulation to the light source system within the period of the frame. Compared to the embodiment 1, this embodiment can greatly reduce a scanning speed of the scanner and a current modulation speed of the light-source modulation device.

In each color sub-frame of the embodiment 7, operations and modulations for the light source system 31, the scanner group 32, the spatial light modulator group 33, the processing and control system 34 and the light-source modulation device 35 may be achieved with reference to the above embodiments, which is not repeated here.

Figure 7:
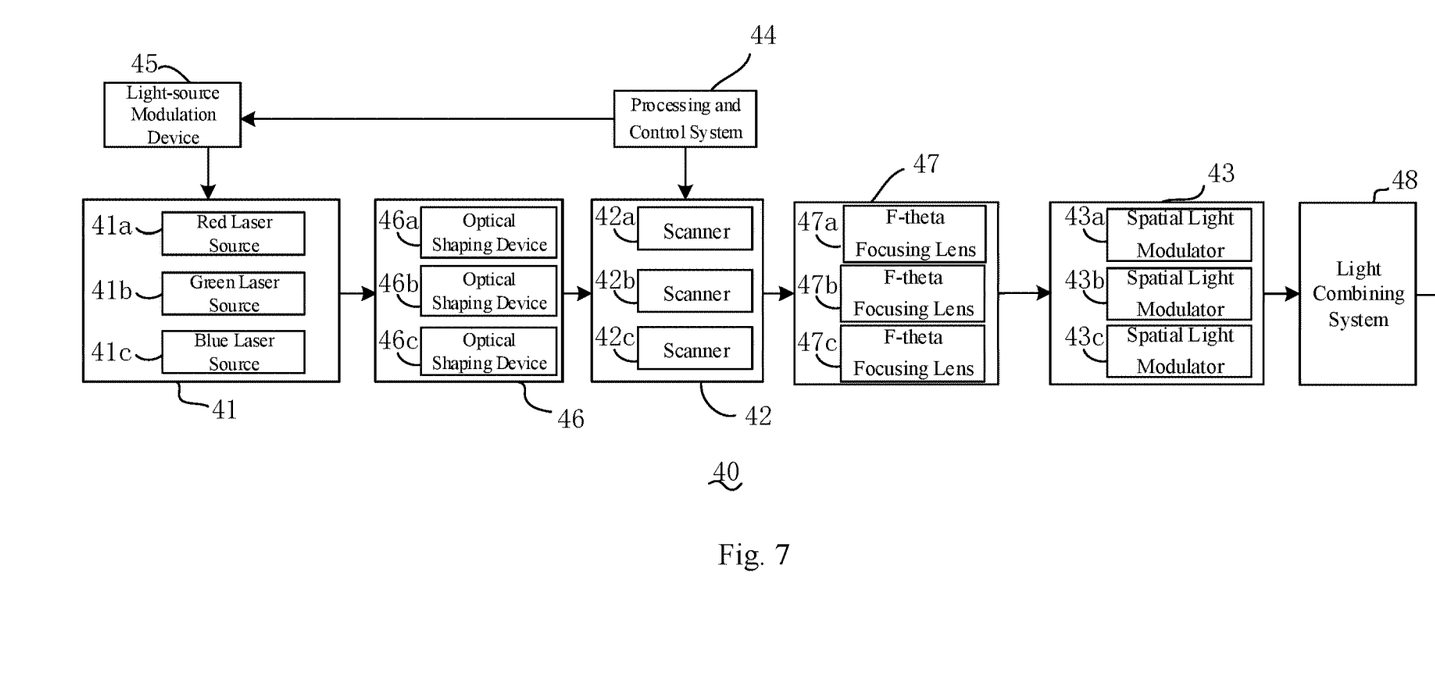
FIG. 7 is a structure schematic diagram of a display system according to an embodiment 8 of the present disclosure.

Referring to FIG. 7, FIG. 7 is a structure schematic diagram of a display system according to an embodiment 8 of the present disclosure.

Figure 8:
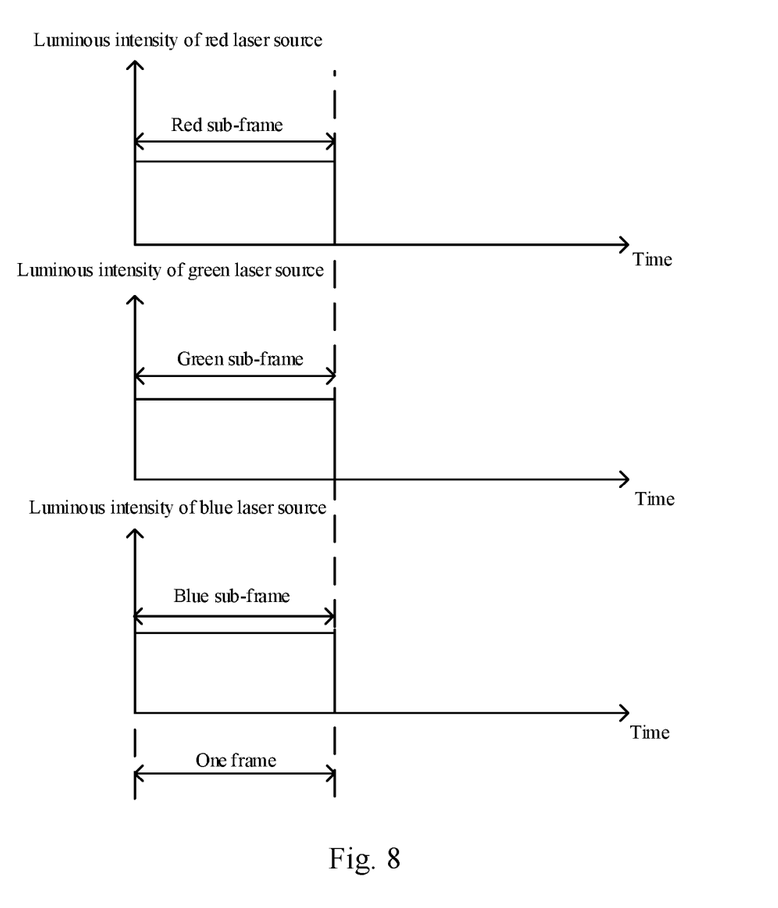
FIG. 8 is an illustration of a time-sequence adjusting mode of a light source system in a display system according to an embodiment 8 of the present disclosure.

The display system 40 in this embodiment differs from that of the embodiment 1 in that the light source system 41 includes a red laser source 41a, a green laser source 41b, and a blue laser source 41c. An example of time-sequence adjustment for the light source system 41 is as shown in FIG. 8. The scanner group 42 includes three scanner 42a, 42b, and 42c. A red laser beam emitted from the red laser source 41a is scanned to a surface of a first spatial light modulator 47a in a form of a light spot, a green laser beam emitted from the green laser source 41b is scanned to a surface of a first spatial light modulator 47a in a form of a light spot, and a blue laser beam emitted from the blue laser source 41c is scanned to a surface of a third spatial light modulator 47c in a form of a light spot. Three spatial light modulators modulate the red light spot, the green light spot, and the blue light spot respectively, and output red image light, green image light, and blue image light respectively. The light combining system 48 is configured to combine the red image light, the green image light, and the blue image light along a light combining light path, thereby obtaining a light beam of the image to be displayed.

In this embodiment, the display system may further include an optical shaping device group 46 and an f-theta focusing lens group 47. The optical shaping device group 46 and the f-theta focusing lens group 47 may operate with reference to the embodiment 1. Identically with the embodiment 1, the optical shaping device group 46 and the f-theta focusing lens group 47 are not essential devices.

In this embodiment, three spatial light modulators are applied to simultaneously modulate three-color light spot formed by the corresponding scanners, i.e., the red light spot, the green light spot, and the blue light spot. Compared to the embodiment 7, the three scanners in this embodiment are only required to traverse the corresponding spatial light modulators in a period of the frame, and the light-source modulation device is also required to complete current modulation of the light source system in the period of the frame. In this embodiment, the scanning speed of the scanner and the current modulation speed of the light-source modulation device can be greatly reduced.

In each color sub-frame of embodiment 8, operations and modulations for the light source system 41, the scanner group 42, the spatial light modulator group 43, the processing and control system 44 and the light-source modulation device 45 may be achieved with reference to the above embodiments, which is not repeated here.

Above embodiments are only embodiments of the present disclosure, and are not limited a patent scope of the present disclosure hereto. Any equivalent structure and equivalent flow variations made by applying the description and accompanying drawings of the present disclosure, or applying the same to other related technical fields directly or indirectly are all included in a patent protection scope of the present disclosure in a similar way.

What is claimed is:

1. A display method, comprising:
   emitting a light beam by a light source system;
   scanning, by a scanner, the light beam emitted from the light source system on a surface of a spatial light modulator in form of a light spot, wherein the light spot is corresponding to a plurality of pixels of the spatial light modulator;
   modulating, by the spatial light modulator, the light spot projected by the scanner on the spatial light modulator according to an image modulation signal from a processing and control system, and outputting image light;
   outputting, by the processing and control system, a light-source time-sequence modulation signal $i_n(t)$ to a light-source modulation device according to an input image signal, and outputting the image modulation signal to the spatial light modulator; and
   adjusting, by the light-source modulation device, a brightness of the light source system according to the light-source time-sequence modulation signal $i_n(t)$.

2. The display method according to claim 1, wherein the outputting, by the processing and control system, a light-source time-sequence modulation signal $i_n(t)$ to a light-source modulation device according to an input image signal comprises:
   dividing an image into multiple sub-image areas along a scanning direction of the light spot, according to an input image signal;
   obtaining an image brightness amplitude signal $L_{in}(t)$ of each sub-image area along the scanning direction of the light spot according to a maximum pixel brightness in the sub-image area;
   performing deconvolution on the image brightness amplitude signal $L_{in}(t)$ and a brightness distribution $L_{gn}(t)$ of the light spot, to obtain a light-source brightness amplitude signal $L_{s1n}(t)$;
   obtaining a light-source brightness amplitude signal $L_{s2n}(t)$ in response to the light-source brightness amplitude signal $L_{s1n}(t)$ passing through a low-pass filter;
   adjusting the light-source brightness amplitude signal $L_{s2n}(t)$ locally, such that in each frame of image, the light-source brightness amplitude signal $L_{s3n}(t)$ is always no less than the image brightness amplitude signal $L_{in}(t)$; and
   obtaining the light-source time-sequence modulation signal $i_n(t)$, in combination with a correlation $i=f(L)$ between the brightness of the light source system and a current of the light source.

3. A display system, comprising:
   a light source system configured to emit a light beam;
   a scanner;
   a spatial light modulator;
   a processing and control system; and
   a light-source modulation device,
   wherein the scanner is configured to scan the light beam emitted from the light source system on a surface of the spatial light modulator in form of a light spot, wherein the light spot is corresponding to a plurality of pixels of the spatial light modulator;
   the spatial light modulator is configured to modulate the light spot projected by the scanner on the spatial light modulator according to an image modulation signal from the processing and control system, and to output image light;
   the processing and control system is configured to output a light-source time-sequence modulation signal $i_n(t)$ to the light-source modulation device according to an input image signal, and output the image modulation signal to the spatial light modulator; and
   the light-source modulation device is configured to adjust a brightness of the light source system according to the light-source time-sequence modulation signal $i_n(t)$.

4. The display system according to claim 3, wherein the processing and control system is configured to
   divide an image into a plurality of sub-image areas along a scanning direction of the light spot according to the input image signal;

obtain an image brightness amplitude signal $L_{in}(t)$ of each sub-image area along the scanning direction of the light spot according to a maximum pixel brightness in the sub-image area; and obtain the light-source time-sequence modulation signal $i_n(t)$ based on a correlation, $i=f(L)$, between the brightness of the light source system and a current of the light source system.

5. The display system according to claim 4, wherein a cut-off frequency of the low-pass filter is greater than or equal to a current modulation bandwidth of the light source system.

6. The display system according to claim 4, wherein a length of the light spot along the scanning direction corresponds to less than 2 pixels of the spatial light modulator.

7. The display system according to claim 3, wherein the processing and control system is configured to divide an image into a plurality of sub-image areas along a scanning direction of the light spot according to the input image signal;

obtain an image brightness amplitude signal $L_{in}(t)$ of each sub-image area along the scanning direction of the light spot according to a maximum pixel brightness in the sub-image area;

obtain a light-source brightness amplitude signal $L_{s2n}(t)$ in response to the image brightness amplitude signal $L_{in}(t)$ passing through a low-pass filter;

adjust the light-source brightness amplitude signal $L_{s2n}(t)$ locally to obtain $L_{s3n}(t)$, wherein in each frame of image, the light-source brightness amplitude signal $L_{s3n}(t)$ is always greater than or equal to the image brightness amplitude signal $L_{in}(t)$; and obtain the light-source time-sequence modulation signal $i_n(t)$ based on the light-source brightness amplitude signal $L_{s3n}(t)$ in combination with a correlation, $i=f(L)$, between the brightness of the light source system and a current of the light source system.

8. The display system according to claim 3, wherein the processing and control system is configured to divide an image into a plurality of sub-image areas along a scanning direction of the light spot according to the input image signal;

obtain an image brightness amplitude signal $L_{in}(t)$ of each sub-image area along the scanning direction of the light spot according to a maximum pixel brightness in the sub-image area;

perform deconvolution on the image brightness amplitude signal $L_{in}(t)$ and a brightness distribution $L_{gn}(t)$ of the light spot, to obtain a light-source brightness amplitude signal $L_{s1n}(t)$; and obtain the light-source time-sequence modulation signal $i_n(t)$ based on the light-source brightness amplitude signal $L_{s1n}(t)$ in combination with a correlation, $i=f(L)$, between a brightness of the light source system and a current of the light source system.

9. The display system according to claim 3, wherein the processing and control system is configured to divide an image into a plurality of sub-image areas along a scanning direction of the light spot according to the input image signal; obtain an image brightness amplitude signal $L_{in}(t)$ of each sub-image area along the scanning direction of the light spot according to a maximum pixel brightness in the sub-image area; perform deconvolution on the image brightness amplitude signal $L_{in}(t)$ and a brightness distribution $L_{gn}(t)$ of the light spot, to obtain a light-source brightness amplitude signal $L_{s1n}(t)$; obtain a light-source brightness amplitude signal $L_{s2n}(t)$ in response to the light-source brightness amplitude signal $L_{s1n}(t)$ passing through a low-pass filter; adjust the light-source brightness amplitude signal $L_{s2n}(t)$ locally to obtain $L_{s3n}(t)$, wherein in each frame of image, the light-source brightness amplitude signal $L_{s3n}(t)$ is always greater than or equal to the image brightness amplitude signal $L_{in}(t)$; and obtain the light-source time-sequence modulation signal $i_n(t)$ based on the light-source brightness amplitude signal $L_{s3n}(t)$ in combination with a correlation, $i=f(L)$, between the brightness of the light source system and a current of the light source system.

10. The display system according to claim 9, wherein a cut-off frequency of the low-pass filter is greater than or equal to a current modulation bandwidth of the light source system.

11. The display system according to claim 3, wherein each sub-image area has a first size corresponding to the same number of pixels of the spatial light modulator with the light spot having a second size.

12. The display system according to claim 3, wherein the processing and control system outputs the image modulation signal to the spatial light modulator, and outputs a synchronous signal to the scanner after a preset time interval; and the scanner directs the light beam to an original scanning position on the surface of the spatial light modulator upon receiving the synchronous signal.

13. The display system according to claim 12, wherein the spatial light modulator is a transmissive liquid crystal light valve or a reflective liquid crystal light valve.

14. The display system according to claim 12, wherein the preset time interval is a maximum deflection time required by the spatial light modulator in one frame of an image.

15. The display system according to claim 3, further comprising:

an optical shaping device provided in a light path between the light source system and the scanner, and configured to direct a light beam emitted from the light source system to the scanner.

16. The display system according to claim 3, further comprising:

an f-theta focusing lens provided in a light path between the scanner and the spatial light modulator, and configured to linearly scan a deflection light beam outputted by the scanner to the spatial light modulator.

17. The display system according to claim 3, wherein the light spot has a width of one pixel along a scanning direction.

18. The display system according to claim 3, wherein after the spatial light modulator receives the image modulation signal and completes deflection, the processing and control system outputs a synchronous signal to the scanner; and the scanner directs the light beam to an original scanning position on the surface of the spatial light modulator upon receiving the synchronous signal.

* * * * *